(12) United States Patent
Donovan et al.

(10) Patent No.: US 7,970,401 B2
(45) Date of Patent: Jun. 28, 2011

(54) ASSOCIATING A HANDOFF ADDRESS TO A COMMUNICATION SESSION

(75) Inventors: Steven R. Donovan, Plano, TX (US);
David A. Ladd, Lisle, IL (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 11/428,671

(22) Filed: Jul. 5, 2006

(65) Prior Publication Data

US 2008/0009287 A1 Jan. 10, 2008

(51) Int. Cl.
*H04W 36/00* (2009.01)
(52) U.S. Cl. ........ 455/436; 370/345; 370/341; 370/252; 370/235; 370/329; 370/401; 370/328; 370/331; 370/349; 370/335; 370/338; 455/552; 455/553; 455/442; 455/438; 455/445; 455/426
(58) Field of Classification Search ............... 455/414.1, 455/436, 445, 426.1, 132.2, 123, 67.11, 439, 455/437, 438, 422, 414, 453, 552.1, 553.1, 455/42.1, 444, 12.1, 442; 370/352, 245, 370/229, 331, 389, 349, 335, 328, 310, 329, 370/332, 342, 338, 312, 345, 341, 252, 235, 370/401; 726/23
See application file for complete search history.

(56) References Cited

U.S. PATENT DOCUMENTS

| 5,943,333 | A | * | 8/1999 | Whinnett et al. | 370/345 |
|---|---|---|---|---|---|
| 6,522,880 | B1 | * | 2/2003 | Verma et al. | 455/436 |
| 6,539,225 | B1 | | 3/2003 | Lee | 455/436 |
| 6,611,510 | B2 | | 8/2003 | Famolari et al. | 370/335 |
| 6,633,554 | B1 | * | 10/2003 | Dalal | 370/331 |
| 6,768,726 | B2 | | 7/2004 | Dorenbosch et al. | 370/331 |
| 6,850,503 | B2 | | 2/2005 | Dorenbosch et al. | 370/331 |
| 6,904,029 | B2 | | 6/2005 | Fors et al. | 370/331 |
| 6,931,249 | B2 | | 8/2005 | Fors et al. | 455/436 |
| 6,954,444 | B2 | * | 10/2005 | Ji et al. | 370/331 |
| 7,058,030 | B2 | * | 6/2006 | Ekl et al. | 370/328 |
| 7,127,250 | B2 | * | 10/2006 | Gallagher et al. | 455/436 |
| 7,263,093 | B1 | * | 8/2007 | Vollmer | 370/352 |
| 2003/0045294 | A1 | * | 3/2003 | Kumar et al. | 455/444 |
| 2003/0224792 | A1 | * | 12/2003 | Verma et al. | 455/436 |
| 2004/0116120 | A1 | * | 6/2004 | Gallagher et al. | 455/436 |
| 2004/0142723 | A1 | * | 7/2004 | Shippee | 455/552.1 |
| 2004/0151139 | A1 | * | 8/2004 | Li et al. | 370/331 |
| 2004/0156365 | A1 | * | 8/2004 | Suzuki et al. | 370/389 |
| 2004/0192211 | A1 | * | 9/2004 | Gallagher et al. | 455/67.11 |
| 2004/0218563 | A1 | * | 11/2004 | Porter et al. | 370/329 |
| 2004/0250133 | A1 | * | 12/2004 | Lim | 713/201 |
| 2005/0025132 | A1 | * | 2/2005 | Harper et al. | 370/352 |
| 2005/0101329 | A1 | * | 5/2005 | Gallagher | 455/436 |
| 2005/0130659 | A1 | * | 6/2005 | Grech et al. | 455/436 |
| 2005/0159158 | A1 | * | 7/2005 | Pardeep et al. | 455/436 |
| 2005/0186948 | A1 | * | 8/2005 | Gallagher et al. | 455/414.1 |
| 2005/0227691 | A1 | * | 10/2005 | Pecen et al. | 455/435.2 |
| 2005/0265279 | A1 | * | 12/2005 | Markovic et al. | 370/328 |
| 2005/0265284 | A1 | * | 12/2005 | Hsu et al. | 370/331 |

(Continued)

*Primary Examiner* — Marivelisse Santiago-Cordero
*Assistant Examiner* — Joseph Arevalo
(74) *Attorney, Agent, or Firm* — Baker Botts L.L.P.

(57) ABSTRACT

A system and method for associating a handoff address to a communication session includes determining one or more communication sessions are established in a first network. Each of one or more handoff addresses is associated with each of the one or more communication sessions. Associating each of the one or more handoff addresses is according to a temporal order of establishment of the one or more communication sessions.

14 Claims, 3 Drawing Sheets

U.S. PATENT DOCUMENTS

| | | | |
|---|---|---|---|
| 2005/0286466 A1* | 12/2005 | Tagg et al. | 370/329 |
| 2006/0077934 A1 | 4/2006 | Lee et al. | 370/331 |
| 2006/0099935 A1* | 5/2006 | Gallagher et al. | 455/414.1 |
| 2006/0121902 A1* | 6/2006 | Jagadeesan et al. | 455/439 |
| 2006/0153110 A1* | 7/2006 | Morgan et al. | 370/310 |
| 2006/0154665 A1* | 7/2006 | Svensson et al. | 455/436 |
| 2006/0217112 A1* | 9/2006 | Mo | 455/422.1 |
| 2006/0268711 A1* | 11/2006 | Doradla et al. | 370/235 |
| 2007/0133465 A1* | 6/2007 | Promenzio et al. | 370/331 |
| 2007/0242637 A1* | 10/2007 | Dynarski et al. | 370/331 |
| 2008/0049675 A1* | 2/2008 | Burgan et al. | 370/331 |

* cited by examiner

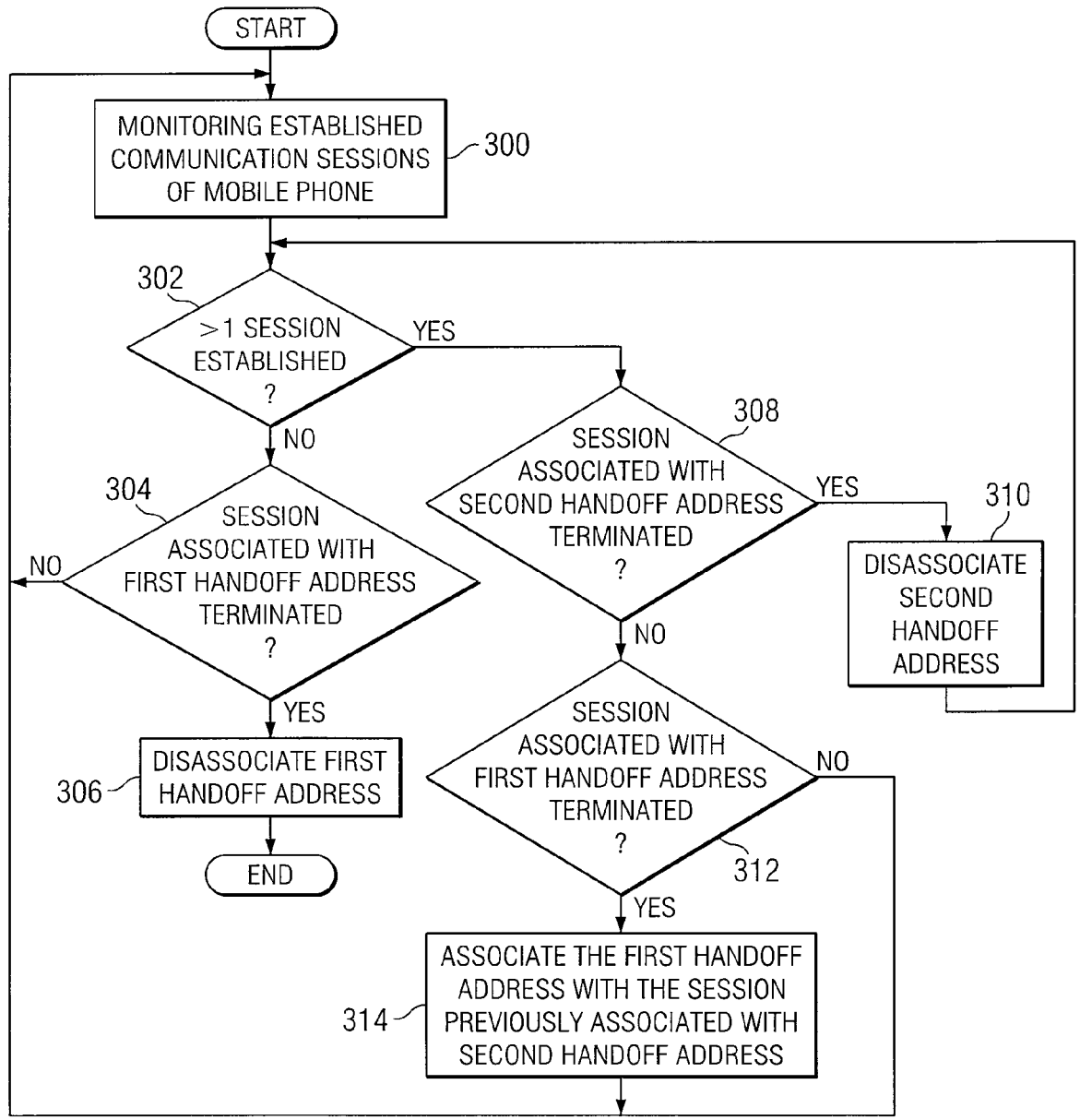

ASSOCIATING A HANDOFF ADDRESS TO A COMMUNICATION SESSION

TECHNICAL FIELD

This invention relates generally to the field of telecommunications and more specifically to associating a handoff address to a communication session.

BACKGROUND

A communication session for a multiple mode mobile phone may be handed off between different types of communication networks. If the mobile phone has multiple communication sessions established, the handoff between networks may cause a disruption of each communication session's state.

SUMMARY OF THE DISCLOSURE

In accordance with the present invention, disadvantages and problems associated with previous techniques for maintaining the state of multiple communication sessions during a handoff between networks may be reduced or eliminated.

According to one embodiment of the present invention, a system and method for associating a handoff address to a communication session includes determining one or more communication sessions are established in a first network. Each of one or more handoff addresses is associated with each of the one or more communication sessions. Associating each of the one or more handoff addresses is according to a temporal order of establishment of the one or more communication sessions.

Certain embodiments of the invention may provide one or more technical advantages. A technical advantage of one embodiment includes associating a handoff address to a communication session using establishment-time to assign the handoff address to the session. The association of the handoff address based on establishment-time provides for properly and seamlessly handing off multiple communication sessions between communication networks. Associating each communication session with a handoff address improves the handoff by maintaining the state of each communication session during the handoff. Another technical advantage of an embodiment includes maintaining the correct remote party for each communication session. Yet another technical advantage of an embodiment includes using a configuration approach to load the handoff address into a mobile phone. Therefore, the need for separate communication of handoff address associations between the mobile phone and the network is eliminated. Accordingly, the performance characteristics of the network are improved.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method for modifying the relationship between communication sessions and handoff addresses resulting from the termination of a communication session using the system of FIG. 1.

DETAILED DESCRIPTION OF THE DRAWINGS

Figure 1:
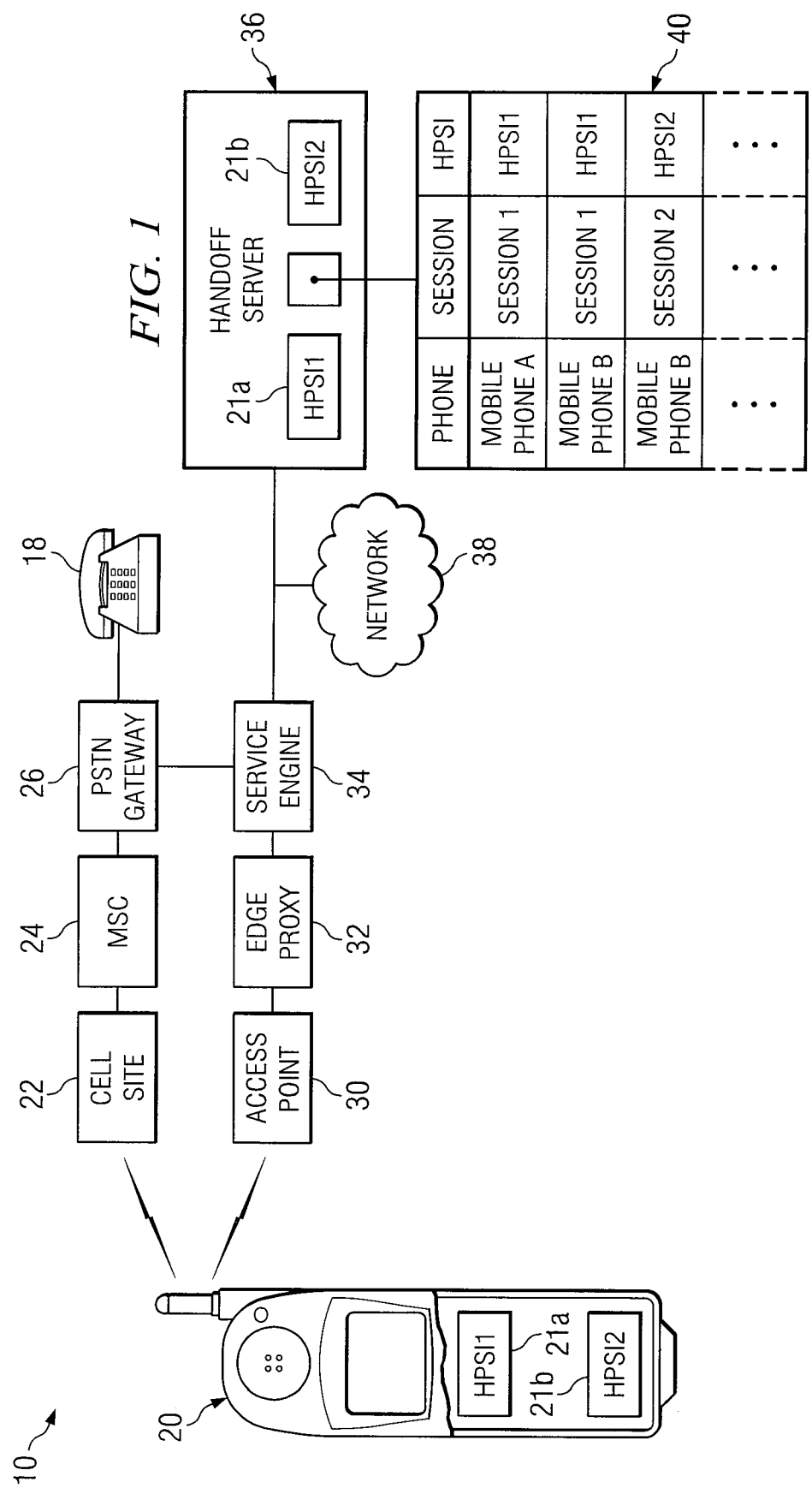
FIG. 1 is a block diagram illustrating a system for associating a handoff address to a communication session.
Figure 2:
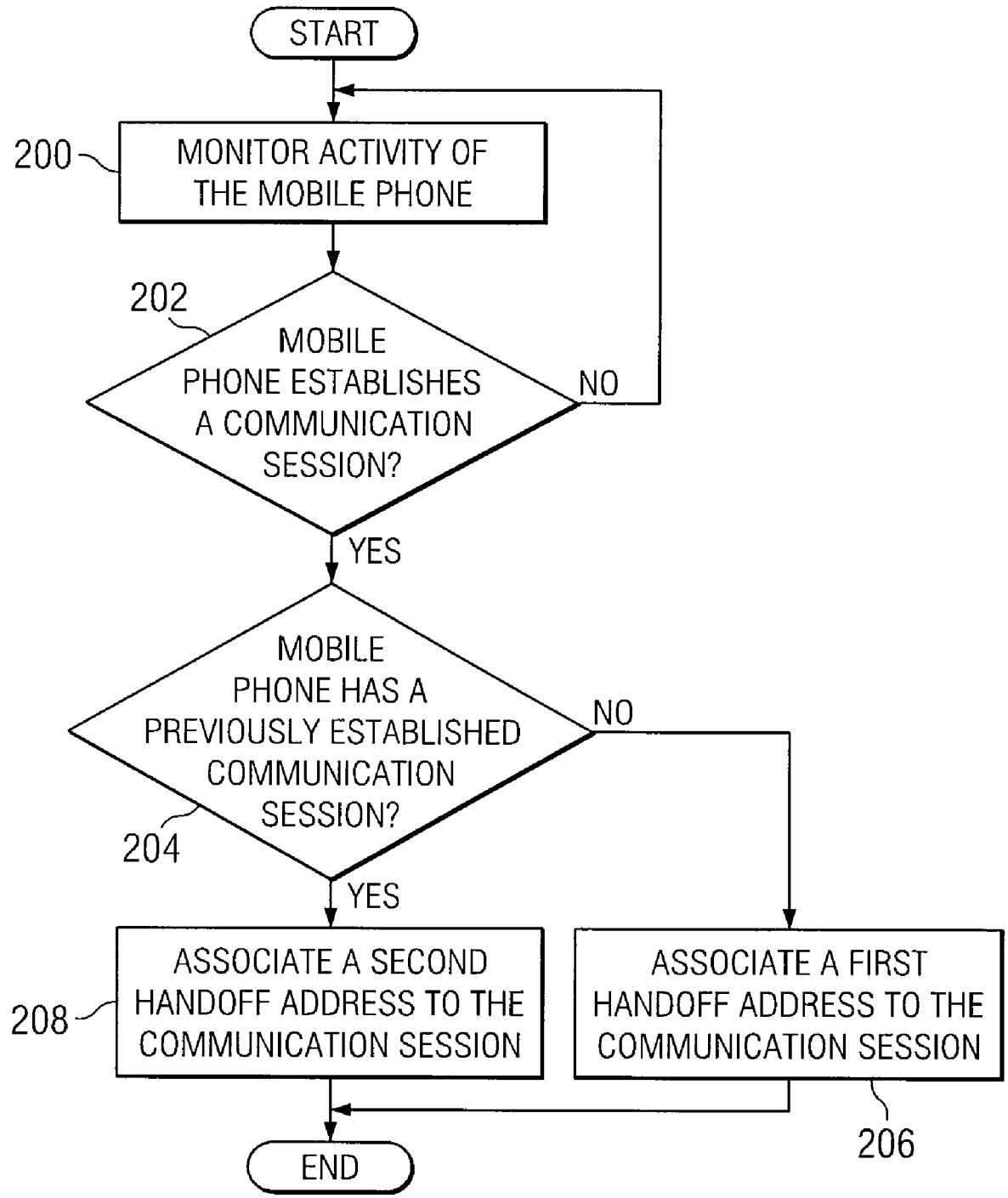
FIG. 2 is a flowchart illustrating one embodiment of a method for establishing a relationship between a new communication session and a handoff address using the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating a system for associating a handoff address to a communication session. According to an embodiment, a cellular network and a Wireless Fidelity (WiFi) Voice over Internet Protocol (VoIP) network facilitate communications sessions of a mobile phone. The mobile phone may handle multiple communication sessions simultaneously, which are handed off between networks as the coverage of the mobile phone changes. Handoff addresses are configured into mobile phone 20 and handoff server 36 and associated with each communication session established. The order in which mobile phone 20 establishes the communication sessions designates which handoff address is associated with the communication session. Associating the handoff address with each communication session provides for a seamless handoff between networks.

A communication session, or call, may refer to an active communication between endpoints, measured from endpoint to endpoint. Information is communicated during a communication session. Information may refer to voice, data, text, audio, video, multimedia, control, signaling, other information, or any combination of the preceding. System 10 may communicate information in packets. A packet may comprise a bundle of information organized in a specific way for transmission, and a frame may comprise the payload of one or more packets organized in a specific way for transmission. A packet-based communication protocol such as Internet Protocol (IP) may be used to communicate the packets.

System 10 includes communication networks. A communication network allows devices, such as mobile phone 20, to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, other suitable communication link, or any combination of the preceding.

A network may utilize communication protocols and technologies to provide communication sessions. Example communication protocols and technologies include those set by the Institute of Electrical and Electronics Engineers, Inc. (IEEE) 802.xx standards such as 802.11 and 802.16 standards, the International Telecommunications Union (ITU-T) standards, the European Telecommunications Standards Institute (ETSI) standards, the Internet Engineering Task Force (IETF) standards, or other suitable standards.

According to one embodiment, system 10 includes networks of different network types. A network type may be designated in accordance with the communication protocols and technologies used for the network. Examples of networks of different network types include cellular networks, WiFi IP networks, VoIP networks, network types involving other communication protocols or technologies, or any combination of the preceding.

A cellular network may be based on any suitable cellular protocol, for example, protocols set forth by the Global System for Mobile Communications (GSM) standards or the American National Standards Institute (ANSI) 41 standards. A VoIP network may be based on any suitable packet protocol, for example, the Session Initiation Protocol (SIP) set forth by the IETF. A VoIP network may comprise, for example, a Third Generation Partnership Project (3GPP) IP Multimedia Subsystem (IMS) network.

Other examples of networks of different network types include a PSTN, a public land mobile network (PLMN), a network-based call signaling (NCS) network, a SIP peer network, other suitable network, or any combination of the proceeding.

According to the illustrated embodiment, system 10 operates to provide services, such as communication services, to devices, such as endpoint 18 and mobile phone 20. To facilitate the provision of communication services to devices, system 10 includes access nodes, such as a cell site 22 and an access point 30, a mobile switching center (MSC) 24, a PSTN gateway 26, an edge proxy 32, a service engine 34, a handoff server 36, and a network 38 coupled as shown. Cell site 22 provides mobile phone 20 access to a cellular network, and access point 30 provides mobile phone 20 access to a WiFi network.

Endpoint 18 and mobile phone 20 may be any combination of hardware and/or software that provide communication services to a user. Endpoint 18 may include analog, digital, or IP telephones, a personal computer such as a laptop or a desktop, a personal computer running a telephony application, a personal digital assistant, or any suitable device operable to communicate within system 10.

Mobile phone 20 represents any suitable device operable to communicate with a communication network via a wireless link. Mobile phone 20 includes any suitable arrangement of components operable to form the operations of mobile phone 20, and may comprise logic, an interface, memory, other component, or any suitable combination of the preceding. Mobile phone 20 may comprise, for example, a personal digital assistant, a computer such as a laptop, a cellular telephone, a mobile handset, or any other device operable to communicate with system 10. According to one embodiment, mobile phone 20 may be operable to communicate with different types of networks. As an example, mobile phone 20 communicates with a cellular network and a WiFi network.

Mobile phone 20 is configured with one or more handoff addresses 21. In the illustrated embodiment, mobile phone 20 is configured with two handoff addresses 21a and 21b. Configuring mobile phone 20 with multiple handoff addresses 21 provides for differentiating communication sessions when they are handed off between networks and maintaining the state of each communication session during the handover procedure. Handoff address 21 represents a Handoff Public Service Identifier (HPSI) in IMS specifications. HPSI represents an address associated with a handoff service or a cluster of handoff servers 36. HPSI identifies the handoff service and the specific communication session associated with the HPSI. The handoff address 21 associated with a communication session changes dynamically as mobile phone 20 establishes and terminates communication sessions, and mobile phone 20 may use handoff address 21 to initiate a handover procedure between networks. For example, handoff address 21 includes information to establish a new communication session leg in the different network. Multiple mobile phones 20 may have handoff addresses 21a and 21b associated with their communication sessions. Therefore, handoff addresses 21 do not have to be different between different mobile phones 20.

An access node may refer to a network node that couples a wireless network, such as a radio frequency (RF) network, to a wired network, such as a wired area network. An access node is associated with coverage within which the access node can communicate with mobile phone 20 via signals over a wireless link, and may provide access to mobile phone 20 within the coverage of the access node. An access node typically has an access node identifier that uniquely identifies the access node.

According to the illustrated embodiment, the access nodes include cell site 22 and access point 30. According to one embodiment, cell site 22 refers to a cellular network cell site. Cell site 22 may comprise any suitable device operable to provide cellular wireless services to mobile phone 20 present in the coverage of cell site 22. For example, cell site 22 includes a base transceiver station and a base station controller.

Mobile switching center (MSC) 24 represents a telephone switch that bridges a mobile network with another network. MSC 24 provides services and coordinates between mobile phones 20 and other networks. In the illustrated embodiment, MSC 24 bridges the mobile network with a PSTN gateway 26.

PSTN gateway 26 represents communications equipment, including hardware and any appropriate controlling logic, through which any suitable device may communicate. PSTN gateway 26 may include switches, wireline and wireless communication devices, and any other appropriate equipment for interconnecting PSTN gateway 26 with other networks. PSTN gateway 26 may include portions of public and private networks providing network transport services between various geographic areas and networks. In an embodiment, PSTN gateway 26 facilitates the interaction with other networks by converting communications between different communication protocols.

According to one embodiment, access point 30 may comprise a WiFi access point. A WiFi access point may comprise any suitable device operable to provide WiFi wireless services to mobile phones 20 present in the coverage of the access point.

Edge proxy 32 ensures that a mobile phone 20 that sends messages to edge proxy 32 can receive messages. As an example, edge proxy 32 ensures that a registered mobile phone 20 can receive requests. Edge proxy 32 may communicate with mobile phone 20 using any suitable protocol, such as SIP and Simple Traversal of User Datagram Protocol (UDP) through Network Address Translation (NAT) (STUN) protocol.

Edge proxy 32 may perform any suitable operation to ensure that mobile phone 20 can receive messages. As an example, edge proxy 32 may support techniques for client-initiated keep-alive processes and may generate SIP-option requests for mobile phones 20 that do not refresh connections. As another example, edge proxy 32 may rewrite the contact-header field and register requests and responses, invite requests and responses, subscribe request and responses, and notify requests. Edge proxy 32 may replace the contact-header field with an identifier pointing to edge proxy 32, and include information to allow incoming requests to be properly routed to mobile phone 20.

In an embodiment, service engine 34 operates as a signaling hub for access point 30 to establish access to the WiFi network and to control anchoring decisions in handoff server 36. For example, service engine 34 provides SIP signaling to establish communication sessions for PSTN and IP networks. Service engine 34 may provide SIP routing, SIP registration, name resolution, NAT/Firewall (FW) traversal, other suitable functionality, or any combination of the preceding.

Handoff server 36 performs a handover procedure for a communication session of mobile phone 20. A handover procedure refers to the process by which a communication session for mobile phone 20 is passed from a previous access node to a current access node as mobile phone 20 moves from the coverage of the previous access node to the coverage of the current access node. Handoff server 36 represents a call-control application that anchors the signaling in the WiFi network. For example, handoff server 36 is a back-to-back user agent in a SIP-based VoIP network. During a handover procedure, handoff server 36 manages the establishment of a new communication session leg to the network to which mobile phone 20 is moving. In doing so, the information is redirected to the new leg through the new network.

In the illustrated embodiment, handoff server 36 is configured with handoff address 21a and handoff address 21b and includes a state table 40. State table 40 includes each state of the communication session and the association of handoff addresses 21a and 21b with each communication session of mobile phone 20. In an embodiment, a state represents the current status of a communication session of mobile phone 20. If handoff server 36 is a SIP-based element, handoff addresses 21a and 21b may take the form of a SIP uniform resource identifier (URI). The user portion of the SIP URI is the phone number, and handoff address 21 may be used to initiate handoff of mobile phone 20 from a network to a different network. For example, if mobile phone 20 moves from the WiFi network to the cellular network, the user portion of handoff address 21 may be used as the number of the called party. As another example, if mobile phone 20 moves from the cellular network to the WiFi network, the full URI may be used in the request-URI of the SIP INVITE request. As mentioned above, handoff server 36 maintains the state information of each communication session during a handover procedure. For example, state table 40 includes each mobile phone 20 handoff server 36 services, each communication session mobile phone 20 establishes, and handoff address 21 associated with the communication session.

Network 38 represents a communication network that allows devices, such as mobile phone 20, to communicate with other devices. Network 38 may include any combination of network elements, such as gateways, routers, hubs, switches, and any other hardware and/or software that may implement any suitable protocol or communication.

In an exemplary embodiment of operation, mobile phone 20 establishes a first communication session while in a cellular network. As discussed above, mobile phone 20 and handoff server 36 are configured with handoff addresses 21. For example, mobile phone 20 may configure itself automatically upon start-up, while an administrator configures handoff server 36. In an embodiment, mobile phone 20 and handoff server 36 associate the communication session with handoff address 21a, and handoff server 36 updates state table 40 with the association. While in the cellular network, mobile phone 20 establishes a second communication session while maintaining the first communication session. For example, mobile phone 20 places the first communication session on hold and establishes the second communication session. Any suitable feature may result in mobile phone 20 having multiple communication sessions simultaneously, such as call-on-hold, call waiting, or three-way calling. Mobile phone 20 and handoff server 36 associate the second communication session with handoff address 21b, and handoff server 26 updates state table 20 accordingly.

If mobile phone 20 moves into the coverage of a different network while multiple communication sessions are established, the state of each communication session should be maintained during the handover procedure between networks. Associating each communication session with handoff addresses 21 and having mobile phone 20 and handoff server 36 maintain the association information provides for preserving the state of each communication session. Therefore, in this example, the first communication session remains on hold and the second communication session remains active during the handover procedure.

Modifications, additions, or omissions may be made to system 10. For example, mobile phone 20 and handoff server 36 may be configured with any suitable number of handoff addresses 21 to associate with any suitable number of communication sessions mobile phone 20 handles. The components of system 10 may be integrated or separated according to particular needs. For example, system 10 may include other suitable devices, such as a gateway, a home agent, a foreign agent, an authorization server, other device, or any combination of the preceding. A gateway represents any suitable device operable to interconnect with a network and convert communications between different communication protocols. A home agent of mobile phone 20 refers to an agent that maintains the address of mobile phone 20 and forwards data to mobile phone 20. A foreign agent of mobile phone 20 may refer to an agent that provides the home agent of mobile phone 20 with an address to which data for mobile phone 20 may be forwarded. Moreover, the operations of system 10 may be performed by more, fewer, or other modules. Additionally, operations of system 10 may be performed using any suitable logic.

FIG. 2 is a flowchart illustrating one embodiment of a method for establishing a relationship between a new communication session and a handoff address using system 10 of FIG. 1. Handoff server 36 monitors the activity of mobile phone 20 at step 200, such as when mobile phone 20 establishes a communication session. At step 202, handoff server 36 determines whether mobile phone 20 establishes a communication session. If mobile phone 20 does not establish a communication session, handoff server 36 continues to monitor the activity of mobile phone 20 at step 200.

If mobile phone 20 does establish a communication session, handoff server 36 determines whether mobile phone 20 has a previously established communication session at step 204. This determination provides for associating the appropriate handoff address 21 with the communication session. The association of handoff addresses 21 with communication sessions is based on temporal establishment of the communication sessions. For example, the first established communication session will be associated with handoff address 21a, and the second established communication session will be associated with handoff address 21b. Accordingly, if mobile phone 20 does not have a previously established communication session, handoff server 36 associates handoff address 21a with the established communication session at step 206. If mobile phone 20 has a previously established communication session at step 204, handoff server associates handoff address 21b with the second established communication session at step 208.

Modifications, additions, or omissions may be made to the method. For example, mobile phone 20 also associates handoff addresses 21 to established communication sessions based on the temporal establishment of each communication session in addition to handoff server 36. The association of handoff addresses 21 with communication sessions at mobile phone 20 and handoff server 36 further provides for maintaining the state of communication sessions during the handover procedure. For example, if mobile phone 20 associates a communication session with a different handoff address 21 than handoff server 36 associates with the communication session, the state of the communication may be altered after handoff. Misassociating handoff addresses 21 and communication sessions may result in remote parties in each of the sessions being exchanged, which may result in billing errors. The method may include more, fewer, or other steps. Additionally, steps may be performed in any suitable order.

FIG. 3 is a flowchart illustrating one embodiment of a method for modifying the relationship between communication sessions and handoff addresses resulting from the termination of a communication session using system 10 of FIG. 1. When mobile phone 20 establishes one or more communication sessions, handoff server 36 monitors the established communication sessions at step 300. In an embodiment, mobile phone 20 may establish additional communication sessions while handoff server 36 monitors existing communication sessions. Handoff addresses 21 are dynamically associated with communication sessions as mobile phone 20 initiates and terminates communication sessions. The dynamic association of handoff addresses 21 depends on the number of communication sessions mobile phone 20 has established. Therefore, it is determined at step 302 whether mobile phone 20 has more than one communication session established.

If mobile phone 20 has one communication session established, that communication session is associated with handoff address 21a. At step 304, handoff server 36 determines whether the communication session associated with handoff address 21a is terminated. If the communication session is not terminated, handoff server 36 continues to monitor the established communication session. If the communication session associated with handoff address 21a is terminated, handoff server 36 disassociates handoff address 21a from its association with the terminated communication session at step 306.

If mobile phone 20 has more than one communication session established, handoff server 36 determines at step 308 whether the communication session associated with handoff address 21b is terminated. If the communication session associated with handoff address 21b is terminated, handoff server 36 disassociates handoff address 21b associated with the terminated communication session at step 310. Handoff server 36 continues to monitor the remaining communication session and determines the status of remaining communication sessions.

If the communication session associated with handoff address 21b is not terminated, handoff server 36 determines whether the communication session associated with handoff address 21a is terminated at step 312. If that communication session is still established, handoff server 36 continues to monitor the communication session at step 300. However, if the communication session is terminated at step 312, handoff server 36 associates handoff address 21a with the communication session having a previous association with handoff address 21b. The reassociation of handoff address 21a occurs at step 314. Therefore, the association of handoff address 21 is dynamic and communication sessions may associate with different handoff addresses 21 while established.

For example, mobile node 20 establishes a communication session that associates with handoff address 21a. Mobile node 20 establishes another communication session that associates with handoff address 21b. If mobile node 20 terminates the communication session initially associated with handoff address 21a, handoff address 21a dynamically associates with the communication session previously associated with handoff address 21b. Therefore, handoff address 21b is available for association with another communication session that mobile node 20 may establish. Use of this association of handoff addresses 21 with communication sessions ensures that sessions are properly handed over, the correct state of the session is maintained, and the correct remote parties are maintained.

Modifications, additions, or omissions may be made to the method. Mobile phone 20 may establish additional communication sessions while terminating other communication sessions. For example, mobile phone 20 may establish another communication session upon disassociating handoff address 21b. As another example, mobile phone 20 may establish another communication session when handoff address 21a is reassociated with another communication session. As yet another example, mobile phone 20 may handle the disassociation and association of handoff addresses 21 as described in FIG. 3 in addition to handoff server 36. This provides for handoff server 36 and mobile phone 20 similarly disassociating and associating handoff addresses 21. The method may include more, fewer, or other steps. Additionally, steps may be performed in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for associating a handoff address to a communication session, comprising:
   determining a first mobile phone establishes a first communication session and a second communication session in a first network, wherein the first communication session and the second communication session are concurrent communication sessions in the first network;
   determining a second mobile phone establishes a first communication session and a second communication session in the first network;
   associating a first handoff address with each of the first communication sessions of the first and second mobile phones and a second handoff address with each of the second communication sessions of the first and second mobile phones and wherein associating the first and second handoff addresses is according to a temporal order of establishment of the communication sessions;
   determining whether the first communication session of the first mobile phone terminates;
   associating the first handoff address with the second communication session of the first mobile phone when the first communication session with the first mobile phone terminates;
   disassociating the second handoff address from the second communication session of the first mobile phone when the first communication session with the first mobile phone terminates;
   determining whether the second communication session of the first mobile phone associated with the first handoff address terminates; and
   disassociating the first handoff address from the second communication session of the first mobile phone when the second communication session of the first mobile phone terminates.

2. The method of claim 1, further comprising:
handing off a communication session to a second network;
maintaining an association of each of the first and second handoff addresses with each of the communication sessions; and
maintaining a state of each communication session during a hand off.

3. The method of claim 1, further comprising updating a state table with association information of each communication session established by each mobile phone.

4. The method of claim 3, wherein the state table comprises an identifier of a mobile phone, an identifier of a communication session established by the mobile phone, and a handoff address associated with the communication session.

5. The method of claim 1, further comprising:
determining whether the first mobile phone establishes another communication session; and
associating the disassociated second handoff address with the other communication session.

6. The method of claim 1, further comprising receiving a configuration of at least two handoff addresses to associate with at least two communication sessions.

7. The method of claim 1, further comprising:
facilitating a handover procedure from a first network to a second network; and
maintaining an association of each of the one or more handoff addresses with each of the one or more communication sessions during the handover procedure; and
maintaining a state of each communication session during the handover procedure.

8. The method of claim 1, wherein associating each of the one or more handoff addresses is according to an existing number of communication sessions established by a mobile phone.

9. The method of claim 1, wherein the handoff address is a Handoff Public Service Identifier.

10. A system for associating a handoff address to a communication session, comprising:
a first mobile phone configured to:
establish a first communication session and a second communication session in a first network, wherein the first communication session and the second communication session are concurrent communication sessions in the first network; and
associate a first handoff address with the first communication session and the second handoff address with the second communication session, wherein associating the first and second handoff addresses is according to a temporal order of establishment of the communication sessions;
a second mobile phone configured to:
establish a first communication session and a second communication session in the first network; and
associate the first handoff address with the first communication session and the second handoff address with the second communication session, wherein associating the first and second handoff addresses is according to a temporal order of establishment of the communication sessions; and
a handoff server configured to:
determine the communication sessions are established in the first network; and
associate a first handoff address with each of the first communication sessions of the first and second mobile phones and a second handoff address with each of the second communication sessions of the first and second mobile phones and wherein association of handoff addresses to the communication sessions
by the handoff server matches the association of handoff addresses to the communication sessions by the first and second mobile phones;
determine whether the first communication session of the first mobile phone terminates; and
when the first communication session of the first mobile phone terminates:
associate the first handoff address with the second communication session of the first mobile phone;
disassociate the second handoff address from the second communication session of the first mobile phone;
determine whether the second communication session of the first mobile phone associated with the first handoff address terminates; and
when the second communication session of the first mobile phone terminates, disassociating the first handoff address from the second communication session of the first mobile phone.

11. The system of claim 10, wherein a mobile phone moves into coverage of a second network:
the handoff server is further operable to hand off a communication session to the second network in a handover procedure;
the first and second mobile phones and the handoff server are each further operable to:
maintain an association of each of the first and second handoff addresses with each of the communication sessions during the handover procedure of the communication sessions from the first network to the second network; and
maintain a state of each communication session during the handover procedure.

12. The system of claim 10, wherein the handoff server is further operable to update a state table with association information of each communication session established by each mobile phone.

13. The system of claim 10, wherein:
each mobile phone is operable to receive a configuration of at least two handoff addresses to associate with at least two communication sessions; and
the handoff server is operable to receive the configuration of the at least two handoff addresses to associate with the at least two communication sessions.

14. A method for associating a handoff address to a communication session, comprising:
receiving a configuration of a first handoff address to associate with a first communication session and a second handoff address to associate with a second communication session;
determining the first and second communication sessions are established in a first network, wherein the first communication session and the second communication session are concurrent communication sessions in the first network;
associating a first handoff address with the first communication session and a second handoff address with the second communication session, wherein associating the first and second handoff addresses is according to a temporal order of establishment of the first and second communication sessions;
updating a state table with association information of each communication session established by each mobile phone;
handing off the one or more communication sessions to a second network;

maintaining an association of each of the one or more handoff addresses with each of the one or more communication sessions;
determining whether the first communication session terminates;
when the first communication session terminates:
  associating the first handoff address with the second communication session;
  disassociating the second handoff address;
  determining another communication session is established; and
  associating the disassociated second handoff address with the other communication session;
determining whether the second communication session associated with the first handoff address terminates; and
when the second communication session terminates, disassociating the first handoff address from the second communication session.

* * * * *